United States Patent [19]

Nagano

[11] Patent Number: 4,626,229
[45] Date of Patent: Dec. 2, 1986

[54] DERAILLEUR FOR A BICYCLE

[75] Inventor: Masashi Nagano, Izumi, Japan

[73] Assignee: Shimano Industrial Company Limited, Osaka, Japan

[21] Appl. No.: 605,697

[22] Filed: Apr. 30, 1984

[30] Foreign Application Priority Data

May 9, 1983 [JP] Japan .................... 58-81430
Sep. 12, 1983 [JP] Japan ............... 58-141195[U]

[51] Int. Cl.⁴ ............................................. F16H 11/08
[52] U.S. Cl. ........................................ 474/80; 474/82
[58] Field of Search ................................. 474/80, 82

[56] References Cited

U.S. PATENT DOCUMENTS 4,241,617 12/1980 Nagano et al. ................ 474/82
4,443,208 4/1984 Kozakae ..................... 474/82

FOREIGN PATENT DOCUMENTS 3132103 4/1982 Fed. Rep. of Germany.
3036111 5/1982 Fed. Rep. of Germany.
2423390 11/1979 France.
2506251 11/1982 France.
2089448 6/1982 United Kingdom.

Primary Examiner—Stephen J. Novosad
Assistant Examiner—Bruce Kisliuk
Attorney, Agent, or Firm—Stevens, Davis, Miller & Mosher

[57] ABSTRACT

A derailleur for a bicycle is provided with a base member, a movable member movable axially of a multistage sprocket assembly, a linkage member for moving the movable member axially of the multistage sprocket assembly, a guide mechanism supported to the movable member and guiding a driving chain from one sprocket to another at the multistage sprocket assembly, and a coiled return spring. At an intermediate portion of the linkage member there is a provided a support shaft for the spring, with the support shaft supporting the coiled portion of the spring. A first end portion of the spring is retained to the linkage member carrying the support shaft, and a second end portion of the spring is movably engaged with a member movable relative to the linkage member, thereby reducing the amount of deflection of the spring for a given amount of movement of the movable member.

7 Claims, 12 Drawing Figures

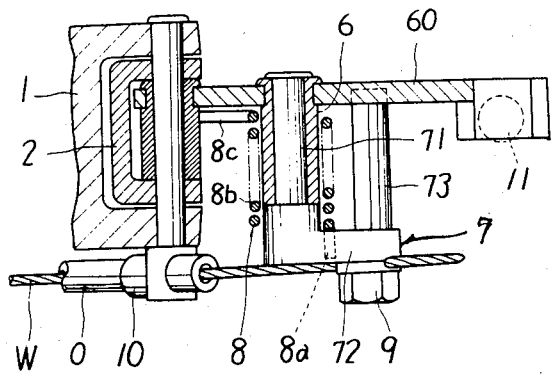
FIG. 3
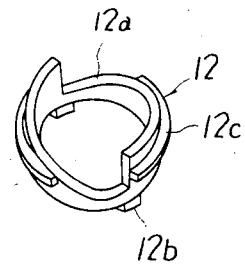
FIG. 4
FIG. 5
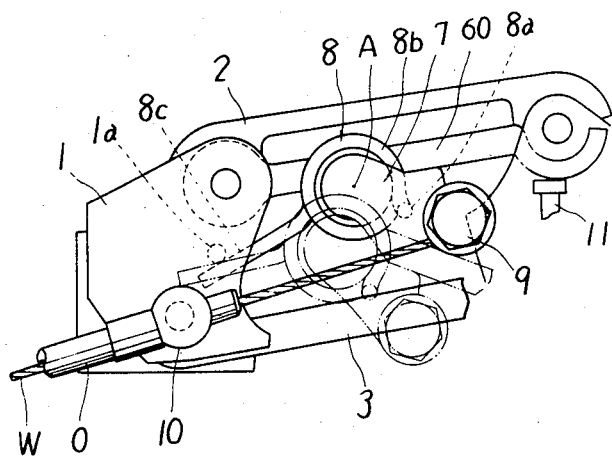

DERAILLEUR FOR A BICYCLE

FIELD OF THE INVENTION

This invention relates to a derailleur for a bicycle, and more particularly, to a derailleur for a bicycle, which shifts a driving chain from one sprocket to another at a multistage sprocket assembly at the bicycle.

BACKGROUND OF THE INVENTION

Generally, a bicycle derailleur is provided with a base member, a movable member movable axially of the multistage sprocket assembly, a shifting means operated from the exterior to move the movable member axially of the same, a guide mechanism for guiding the driving chain from one sprocket to another at the same, and a return spring. The derailleur, when a control wire is pulled for changing the bicycle speed, moves the movable member forwardly against the return spring, and when the control wire is slackened, moves the movable member backwardly by virtue of a restoring force of the return spring, thereby shifting the driving chain from one sprocket to another at the sprocket assembly.

The return spring comprises a coiled spring whose both ends extend tangentially outwardly of its coiled portion. The return spring is supported at is coiled portion around a pivot shaft connecting a linkage member at the shifting means with either the base member or movable member. The return spring abuts at one end against the base member or movable member, and is twisted to contract the coiled portion in diameter so that the spring deflects as a whole. Thereafter, the spring contacts at the other end elastically with the linkage member.

In such conventional deraillieur, a torsion stroke necessary to mount the return spring deflected and an initial load to be given to the shifting means are inevitably defined, so that the return spring is designed to have a spring constant corresponding to the torsion stroke and initial load. As a result, the characteristic of the return spring is specified so as to increase a variation in the spring force with respect to the stroke or length of movement of the movable member, whereby the restoring force of the spring becomes intensive as the number of speed change stages increases. Accordingly, the restoring force of the return spring, when the chain is shifted to the largest diameter sprocket at the multistage sprocket assembly, is very large, whereby a control lever requires a larger operating force for deflecting the return spring for changing the bicycle speed. Hence, the conventional derailleur has been inferior in speed change efficiency.

SUMMARY OF THE INVENTION

A main object of the invention is to provide a derailleur for a bicycle, which can reduce a variation in a spring force of the return spring with respect to an amount of deflection thereof, thereby reducing an operating force especially necessary to shift the driving chain to the larger diameter sprocket.

Another object of the invention is to provide a derailleur for a bicycle which can perform a speed change even in a case where a resistance against speed change, e.g., when the driving chain pauses, is larger than that when the same is driven usually, thereby enabling energy conservation of the operating force.

The derailleur of the invention is provided with a base member, a movable member movable axially of a multistage sprocket assembly mounted to the bicycle, a shifting means having a linkage member operated from the exterior to move the movable member axially of the sprocket assembly, a guide mechanism supported to the movable member and for guiding the driving chain from one sprocket to another at the multistage sprocket assembly, and a coiled return spring having first and second end portions. The return spring is mounted onto a support shaft provided at an intermediate portion of the linkage member of the shifting means between the base member and the moveable member, and is supported at its coiled portion onto the support shaft. The spring return is retained at its first end portion to the linkage member, and engages at its second end portion movably with the base member or movable member moving relative to the linkage member.

Accordingly, when the movable member moves axially of the sprocket assembly by virtue of the shifting means, the coiled portion of the spring follows the operation of the shifting means to reduce a variation in a spring force corresponding to the stroke of the movable member, whereby the chain can be shifted to a larger diameter sprocket especially by operating the lever in a light touch.

The shifting means of the invention mainly uses a pair of linkage members, one of which is provided with the support shaft. Or, a third linkage member, in accordance with an embodiment of the invention to be discussed below, may be used and may be provided with the support shaft.

An operating wire is mainly used for operating the shifting means from the exterior and is mounted to the linkage member through a wire fixture. Alternatively, a saver arm may be used and the control wire may be supported to the fixture provided at the saver arm. In this case, the saver arm is supported to the support shaft and the first end portion of the spring is retained to the saver arm.

In a case in which a saver arm is used, the operating force of the operating lever for overcoming the spring force of the spring may be reduced, whereby the operating lever is operable in a light touch to shift the driving chain even to the largest diameter sprocket, thus improving the speed change efficiency. Also, when a resistance against speed change is larger than a usual resistance, the spring is deflected to conserve energy to ensure proper speed change.

These and other objects of the invention will become more apparent in the detailed description and examples which follow.

BRIEF DESCRIPTION OF THE DRAWINGS

FIG. 3 is a partially enlarged sectional view of the same,

FIG. 4 is a perspective view of a control member only,

FIG. 5 is an illustration of the operation of a spring according to the invention.

DETAILED DESCRIPTION OF THE INVENTION

Figure 1:
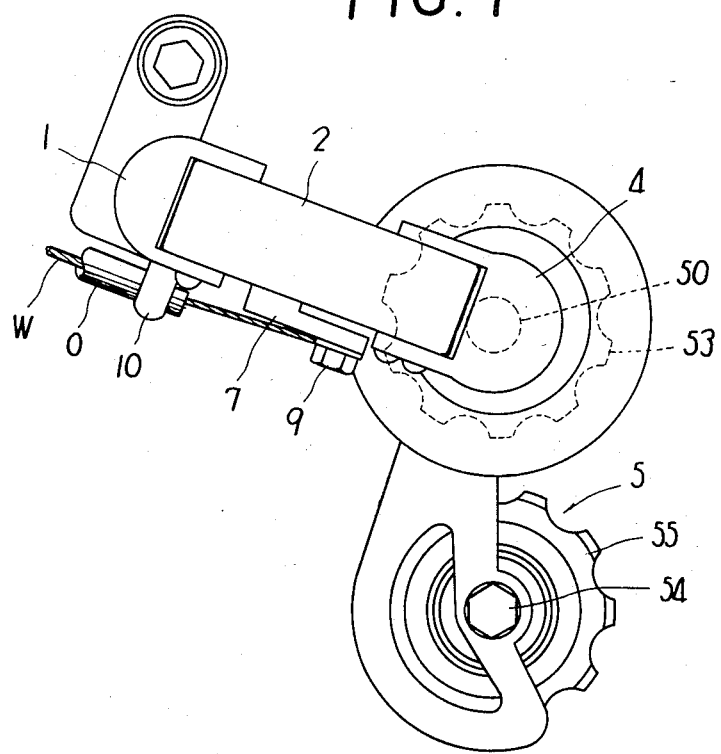
FIG. 1 is a front view of a first embodiment of a derailleur of the invention.

Referring to the drawings, a rear derailleur used for a multistage sprocket assembly mounted to a rear hub at the bicycle is shown, which is basically provided with a linkage mechanism comprising a base member 1, a pair of linkage members 2 and 3 and a movable member 4, with the movable member 4 being provided with a guide mechanism 5 for guiding a driving chain to each sprocket. The movable member 4 moves with respect to the base member 1 to shift the chain from one sprocket to another.

In detail, the base member 1 is mounted to a back fork (not shown) supporting the rear hub at the bicycle, and the guide mechanism 5 comprises a support 51 supported swingably to the movable member 4 through a first pivot shaft 50. A guide pulley 53 is disposed coaxially with the pivot shaft 50 and is supported rotatably with respect to the support 51 through a tubular shaft 52 fixed thereto. A tension pulley 55 is supported rotatably to a free end of support 51 through a second pivot shaft 54. A tension spring 56 to bias the support 51 in the direction of applying tension to the chain is provided around the first pivot shaft 50. Spring 56 is retained at one end to the movable member 4 and at the other end to the support 51.

Figure 2:
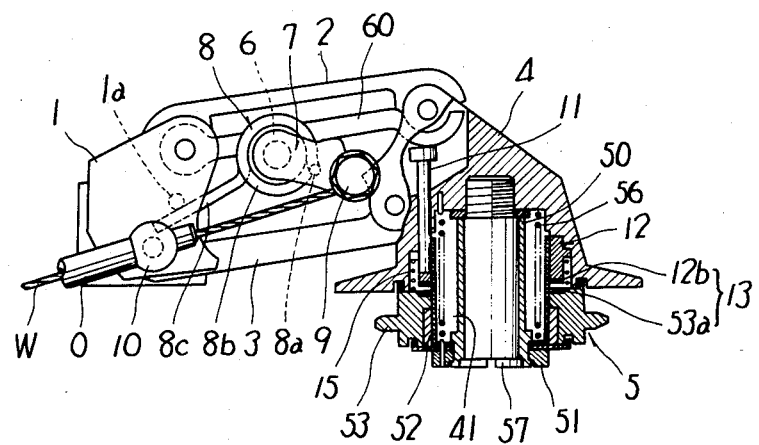
FIG. 2 is a partially cutaway bottom view thereof.

The movable member 4, shown in FIG. 2, is provided at one side with a round cavity 41, into which the first pivot shaft 50 and tubular shaft 52 enter and are fixed through a bolt 57.

In a first embodiment of the derailleur of the invention shown in FIGS. 1 through 8, a third linkage member 60 (to be hereinafter called the clutch lever) separate from the linkage members 2 and 3 is pivoted to the base member 1, and a saver arm 7 is supported swingably to an intermediate portion of clutch lever 60 through a support shaft 6. Spring 8 for bringing the saver arm 7 into elastic contact with the clutch lever 60 is interposed between the saver arm 7 and the base member 1 and held around the support shaft 6. Saver arm 7 is associated with the clutch lever 60 through the spring 8, and a fixture 9 for a control wire W is provided at the saver arm 7. Holder 10 is provided for an outer sheath O guiding the wire W at the base member 1. The clutch lever 60 extends at the utmost end toward the movable member 4. Push rod 11 extends in parallel to the first pivot shaft 50 and is movable axially thereof. Rod 11 is provided at the portion of movable member 4 opposite to the extension of clutch lever 60. Between movable member 4 and the guide mechanism 5 are provided a control member 12, which is operable through the clutch lever 60 and push rod 11, and a clutch means 13 engageable through operation of control member 12.

Figure 6:
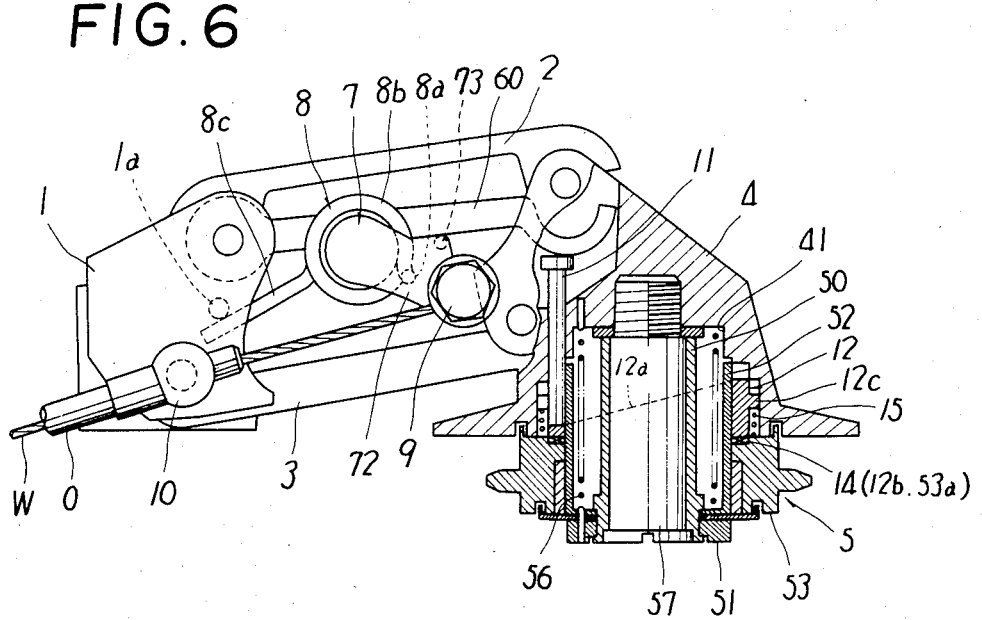
FIGS. 6 and 7 are enlarged bottom views of the derailleur of the invention in operating condition, corresponding to FIG. 2 respectively.
Figure 7:
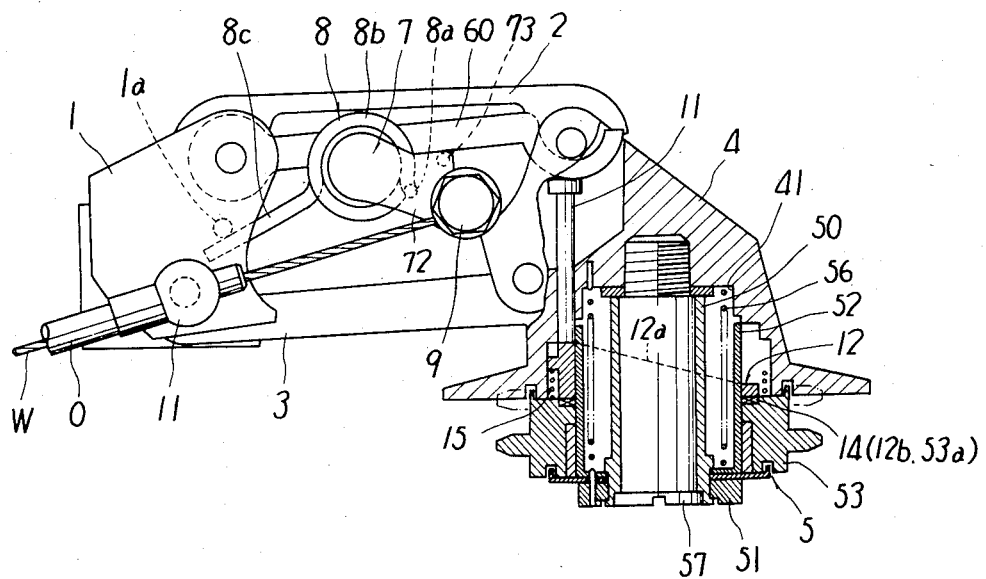

The saver arm 7, as shown in FIG. 3, comprises a shaft 71 extending perpendicular to the operating plane of clutch lever 60, an operating arm 72 extending perpendicularly to the shaft 71, and an interlocking arm 73 extending from the operating arm 72 toward the clutch lever 60. Shaft 71 is pivoted at one end thereof to a lengthwise intermediate portion of clutch lever 60, and the interlocking arm 73 is brought at the utmost end thereof into contact with the clutch lever 60, as shown in FIGS. 6 and 7. Fixture 9 for control wire W is mounted at the utmost end of operating arm 72.

The spring 8 is coiled and extends at a first end portion 8a axially outwardly of a coiled portion 8b and at a second end portion 8c tangentially outwardly of the same, with the coiled portion 8b being held rotatably around the support shaft 6 for supporting the saver arm 7. First end portion 8a is retained to the operating arm 72, and the second end portion 8c is brought into movable and elastic contact with a stopper 1a provided as the base member 1. In operation, when the bicycle speed is changed, the first end portion 8a and coiled portion 8b of spring 8 shift follow the movements of saver arm 7 and clutch lever 60 respectively, with the second end portion 8c shifting at its contact position with respect to the stopper 1a, so that the spring 8 is adapted to reduce a variation in its spring force corresponding to the movement of movable member 4.

Also, the spring 8 functions both as a return spring and a saver spring. In other words, the return spring restores the movable member 4, by its restoring force, from deflection. The saver spring conserves energy for operating the control wire W even when a resistance against speed change, which is caused by a pull of control wire W without driving the chain, is larger than that usually caused by the chain driven. In detail, for a usual resistance against speed change, the saver arm 7 interlocks with the clutch lever 60, and for a resistance larger than usual, the saver arm 7 swings with respect to the clutch lever 60 against the force of spring 8 to be switched previously to a desired speed change stage. Thereafter, when the larger resistance against speed change is eliminated and the driving chain starts to travel, the restoring force of spring 8 actuates the clutch lever 60, and also the guide mechanism 5 shifts to the speed change stage previously switched by operating the control wire W.

The control member 12, as shown in FIG. 4, is made cylindrical and has an inner diameter larger than an outer diameter of tubular shaft 52. Member 12 also forms at one axial end cam faces 12a circumferentially sloped and at the other end clutch projections 12b. Guide pulley 53 provided at the opposite side thereof to the control member 12 with clutch projections 53a opposite to the clutch projections 12b respectively.

Also, the control member 12 is housed in the cavity 41 at the movable member 4 and is sleeved onto the tubular shaft 52 in relation of being movable theralong, with the push rod 11 facing each cam face 12a and moving to push the control member 12 axially outwardly of tubular shaft 52.

Furthermore, the control member 12 is provided at the outer periphery thereof with projections 12c serving as both a spring seat and guide, and between the spring guides 12c and the guide pulley 53 is interposed a return spring 15 for biasing the control member 12 toward the push rod, thereby keeping the clutch projections 12b and 53a disengageable from each other. The return spring 15 is designed as follows:

There is play between the lateral side of one sprocket in mesh with the chain and the inner surface of an inner link plate thereof, so that when the guide mechanism 5 is intended to move axially, the chain at first moves to absorb the play and then disengages from the one sprocket to move toward another sprocket to engage. Hence, in this embodiment, prior to the forced movement of control member 12 through the cam face 12a therefor for changing the bicycle speed, the movable member 4 and guide mechanism 5 are moved through the return spring 15 to thereby absorb the play, in which the spring force of return spring 15 is made larger than a resistance against movement of the chain for absorbing the play.

Next, explanation will be given on operation of the derailleur of the invention in accordance with FIGS. 2 and 6 through 8.

Referring to FIG. 2, the movable member 4 and guide mechanism 5 are positioned at a side of the smaller diameter sprocket and the chain is shifted thereto, in which when the control wire W is pulled, the saver arm 7 swings clockwise against the spring 8 and deflects it.

Figure 8:
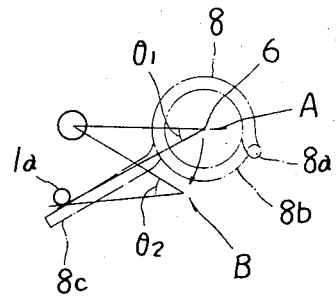
FIG. 8 is an illustration of the spring in operating condition only.
Figure 12:
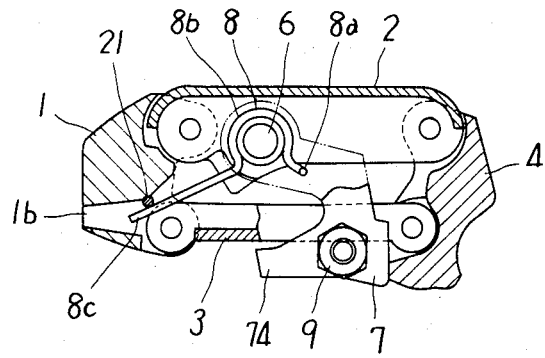
FIG. 12 is a partially cutaway bottom view of a modified embodiment of the invention using a different spring holder corresponding to FIG. 8.

At this time, in a case of driving the chain, the clutch lever 60 swings clockwise through the spring 8 to push, through the push rod 11, the control member 12 axially outwardly of tubular shaft 52 against the return spring 15 which abuts against projections 12c shown in FIG. 4. When the clutch lever 60 swings to move the movable member 4, the support shaft 6 for supporting the saver arm 7 to the clutch lever 60 shifts from the position A to position B as shown in FIG. 8, whereby the spring 8 deflects to an extent of meeting a difference $\theta_2 - \theta_1$ between a twisting angle $\theta_1$ at the position A and angle $\theta_2$ at the positon B. Thus, an amount of deflection to meet the difference $\theta_2 - \theta_1$ serves as the restoring force of spring 8. Hence, even when the chain is shifted to the largest diameter sprocket, the variation in the spring force of spring 8 can be reduced with respect to an amount of movement of movable member 4, and a rotational resistance of the control lever for overcoming the restoring force of spring 8 also can be reduced, thereby enabling the control lever to be operated by a light touch.

Then, the control member 12 is pushed out to engage the clutch projections 12b with the clutch projections 53a. In the embodiment, however, the movable member 4 and guide mechanism 5 are moved through the return spring 15 prior to the engagement of clutch projections 12b and 53a with each other.

In other words, since the spring 8 is made inactive by the swinging motion of saver arm 7 and the movable member 4 is in condition of being freely or easily movable through the linkage members 2 and 3, the operating force acting on the clutch lever 60 is transmitted through the return spring 15 to the movable member 4 and guide mechanism 5, which move toward the larger diameter sprocket, thereby absorbing the play of the chain with respect to the smaller diameter sprocket.

Upon absorbing the play, a resistance larger than that against movement of the chain or absorbing the play is produced in shifting of the chain, whereby the return spring 15 is compressed and the clutch projections 12b and 53a engage with each other.

Upon engagement of the clutch projections 12b and 53a, since the guide pulley 53 rotates through the driven chain, the control member 12 rotates to move with respect to the push rod 11 in engagement with the cam face 12a at the control member 12 as shown in FIG. 7, at which time the push rod 11 is locked by the control wire W with respect to the base member 1 through the clutch lever 60. As a result, movable member 4 and guide mechanism 5 are forced to shift toward the larger diameter sprocket through the linkage members 2 and 3. Thus, the chain is guided by the guide mechanism 5 to be shifted to the larger diameter sprocket.

Then, the control member 12 rotates following the rotation of guide pulley 53, and the movable member 4 and guide mechanism 5 move. Thereafter, the push rod 11 falls down to the bottom of cam face 12a, whereby the control member 12 returns to its original FIG. 2 position, virtue of the return spring 15, and the clutch lever 60, push rod 11 and control member 12 restore to their original positions in FIG. 2 respectively.

In a case where the driving chain is intended to be shifted from the larger diameter sprocket to the smaller diameter one, the control wire W is slackened to swing the saver arm 7 and clutch lever 60 counterclockwise in FIG. 2 by virtue of spring 8 so that the linkage member 2 is pushed to return the movable member 4 and guide mechanism 5, thereby shifting the chain to the smaller diameter sprocket.

On the other hand, in a case where the chain is intended to be shifted from the smaller diameter sprocket to the larger diameter one, when the control wire W is pulled in condition of keeping the chain in pause, the spring 7 deflects to conserve energy, and then the chain, when driven, actuates the clutch lever 60, thereby being shifted to the larger diameter sprocket as aforesaid.

Alternatively, one linkage member 2, as shown in FIGS. 9 through 12, may be provided with a support shaft 6 without using the clutch lever 60, so that the saver arm 7 and coiled portion 8b of spring 8 may be supported to the support shaft 6.

Also, the aforesaid saver arm 7 is not indispensable. In this case of using no saver arm, the support shaft 6 is to be mounted at an intermediate portion of the linkage member 2 or 3 ( not shown ).

Alternatively, the fixture 9 for the control wire W may be provided at the base member 1 and the holder 10 for the outer sheath O may be provided at the saver arm 7. Or, in case that no saver arm is used, the fixture 9 may be provided at the movable member 4 or base member 1, and the holder 10 at the base member 1 or movable member 4.

Figure 9:
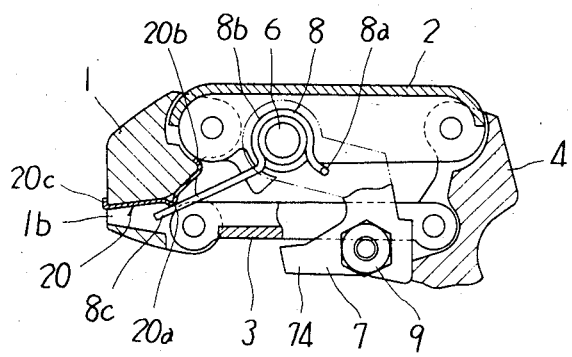
FIG. 9 is a partially cutaway bottom view of a second embodiment of the derailleur of the invention.
Figure 11:
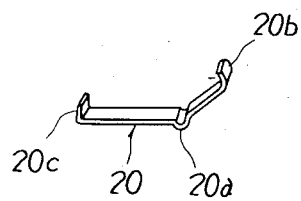
FIG. 11 is a perspective view of a spring holder used in the derailleur in FIG. 8.
Figure 10:
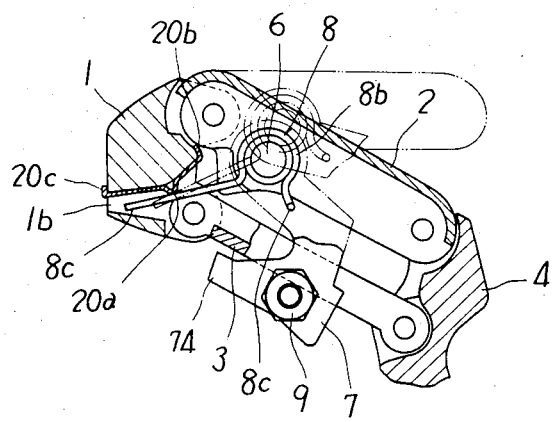
FIG. 10 is an illustration of the second embodiment in operating condition, corresponding to FIG. 9.

Also, the second end portion 8c of spring 8 engages movably through the stopper 1a with the member, for example the base member 1, which is movable relative to the member supporting the coiled portion 8b, the stopper 1a using a pin in with the first embodiment, and alternatively useing a plate-like spring holder 20 as shown in the second embodiment in FIGS. 9 through 11. In this case, the pin or plate-like spring holder is formed mainly of stainless steel of high hardness and wear-resistance because the base member 1, linkage members 2 and 3, and movable member 4, are formed usually of a light alloy, such as aluminum , to be light in weight.

The plate-like spring holder 20, as shown in FIG. 11, uses a stainless steel strip, which is bent at an intermediate portion into a semicircle of smaller curvature to form a contact 20a with respect to the spring 8 and is bent at both lengthwise ends to form a pair of hooks 20b and 20c, by which the spring holder 20 is fixedly fitted onto the base member 1 as shown in FIGS. 9 and 10.

Also, the base member 1 in the second embodiment, as shown in FIGS. 9 and 10, is provided with a hollow 1b, in which the second end portion 8c of spring 8 and the spring holer 20 are inserted.

In addition, in a case where the plate-like spring holder 20 is substituted by a pin stopper 21, the hollow 1b has an angular corner and the pin stopper 21 is fixedly embedded thereinto.

In addition, in a case where the saver arm 7 is used and the wire fixture 9 is mounted thereto as in the first embodiment, the control wire W, when the saver arm 7 is turned by the operating force of wire W, is difficult to fix. In order to solve this problem, a stopper 74 need only be provided at the saver arm 7 to thereby contact therewith to restrain the saver arm 7 from swinging over an effective swinging range.

Although the invention has been described with reference to several different embodiments, these embodiments are merely exemplary and are not limiting of the invention which is defined solely by the appended claims.

What is claimed is:

1. A derailleur for a bicycle for shifting a driving chain from one sprocket to another at a multistage sprocket assembly, said derailleur comprising a base member, a movable member movable axially with respect to said multistage sprocket assembly, shifting means having a linkage member operated from an exterior of said derailleur to move said movable member axially of said multistage sprocket assembly, a guide mechanism supported to said movable member for guiding said driving chain from one sprocket to another at said multistage sprocket assembly, and a return spring supported by said linkage member, said linkage member having a support shaft for said spring positioned at an intermediate portion of said linkage member between said base member and said movable member, said return spring having a coiled portion supported to said support shaft and having first and second end portions, said first end portion being retained to said linkage member and said second end portion engaging movably with said base member, said linkage member being movable relative to said base member.

2. A derailleur for a bicycle according to claim 1, wherein said shifting means comprises a pair of linkage members, one of said linkage members being provided with said support shaft for supporting the coiled portion of said return spring.

3. A derailleur for a bicycle according to claim 1, wherein a saver arm is supported swingably to said support shaft, the first end portion of said spring is retained to said saver arm, and a fixture for a control wire which operates said shifting means from the exterior of said derailleur is mounted on said saver arm.

4. A derailleur for a bicycle for shifting a driving chain from one sprocket to another at a multistage sprocket assembly, said derailleur comprising a base member, a movable member movable axially of said multistage sprocket assembly, shifting means having a linkage member operated from an exterior of said derailleur to move said movable member axially of said multistage sprocket assembly, a guide mechanism which is supported to said movable member for guiding said driving chain from one sprocket to another at said mutistage sprocket assembly, and a return spring supported by said linkage member, said linkage member at said shifting means having a support shaft for said spring at an intermediate portion of said linkage member between said base member and said movable member, said return spring having a coiled portion supported to said support shaft and first and second end portions, said first end portion being retained to said linkage member and said second end portion engaging movably with a member which is movable relative to said linkage member.

5. A derailleur for a bicycle according to claim 4, wherein a saver arm is supported swingably to said support shaft, the first end portion of said spring is retained to said saver arm, and a holder for an outer sheath which guides said wire is mounted on said saver arm.

6. A bicycle derailleur for shifting a driving chain from one sprocket to another at a multistage sprocket assembly, said derailleur comprising:
   (a) a parallelogram linkage mechanism comprising a base member, a pair of linkage members pivotally supported to said base member, a movable member supported to said linkage members, said movable member including a guide mechanism for guiding the driving chain from one sprocket to another of the multistage sprocket assembly, said linkage mechanism being transformable, responsive to swinging motion of said linkage members, to move said movable member in an axial direction with respect to said multistage sprocket assembly,
   (b) a return spring which deflects when said guide mechanism is moved from a smaller diameter sprocket toward a larger diameter sprocket through said movable member responsive to transformation of said linkage mechanism, said return spring for causing said guide mechanism to return from a larger diameter sprocket toward a smaller diameter sprocket, said return spring having a coiled portion and a first and a second end portion,
   (c) a support shaft disposed at an intermediate portion of one of said linkage members between said base member and said movable member, said support shaft supporting said coiled portion of said return spring, said first end portion being retained at said one of said linkage members and said second end portion being movably engageable with a member which is movable relative to said one linkage member.

7. A bicycle derailleur according to claim 6, wherein said intermediate portion of said one of said linkage members is disposed between a pivot position at which said one of said linkage members is pivoted to said base member and a position at which said movable member is pivotally supported to said one of said linkage members.

* * * * *